United States Patent
Correa et al.

[11] Patent Number: 6,016,669
[45] Date of Patent: Jan. 25, 2000

[54] PULSED FUEL-OXYGEN BURNER AND METHOD FOR ROTATABLE WORKPIECES

[75] Inventors: Sanjay Marc Correa; Alan S. Feitelberg, both of Niskayuna, N.Y.

[73] Assignee: General Electric Company, Schenectady, N.Y.

[21] Appl. No.: 09/201,380

[22] Filed: Nov. 30, 1998

[51] Int. Cl.[7] .................................. C03B 23/043
[52] U.S. Cl. .................. 65/109; 65/110; 65/120; 65/268; 65/284; 65/285; 65/271; 65/300; 82/173; 264/80; 264/573; 431/12
[58] Field of Search .................. 65/17.4, 421, 64, 65/109, 110, 120, 268, 284, 285, 271, 300; 264/80, 573; 82/173; 431/12

[56] References Cited

U.S. PATENT DOCUMENTS

| | | | |
|---|---|---|---|
| 1,676,795 | 7/1928 | Mailey et al. | 65/271 |
| 2,917,870 | 12/1959 | Levand | 65/271 |
| 3,810,748 | 5/1974 | Matuzawa et al. | 65/271 |
| 4,528,009 | 7/1985 | Sarkar | 65/403 |
| 4,632,684 | 12/1986 | Karbassiyoon et al. | 65/379 |
| 4,735,644 | 4/1988 | Schneider | 65/421 |
| 5,000,771 | 3/1991 | Fleming, Jr. et al. | 65/391 |
| 5,108,331 | 4/1992 | Shimada et al. | 445/3 |
| 5,518,516 | 5/1996 | Garnham | 65/382 |
| 5,725,829 | 3/1998 | Miyahara et al. | 264/630 |
| 5,803,944 | 3/1997 | Domka | 65/300 |

OTHER PUBLICATIONS

Piekoszewski et al, "Irradiation of silicon with a pulsed plasma beam containing Mo ions," Surface and Coatings Technology, 93, pp. 258–260, 1997 No month available.
Piekoszewski et al, "Modification of the surface properties of materials by pulsed plasma beams," Surface and Coatings Technology, 106, pp. 228–233, 1998 no month available.

*Primary Examiner*—Sean Vincent
*Attorney, Agent, or Firm*—Patrick K. Patnode; Marvin Snyder

[57] ABSTRACT

An apparatus for applying heat to a rotatable workpiece is disclosed. A rotating lathe is provided for mounting a workpiece, for example a quartz tube, thereto so as to enable rotation of the workpiece. At least one translatable burner is coupled to a fuel source and an oxygen source for producing a flame. The burner is directed such that flame impinges upon the workpiece mounted on the rotating lathe. A first pulse control valve is coupled to and positioned between the translatable burner and the fuel source. A second pulse control valve is coupled to and positioned between the translatable burners and the oxygen course. The first and second pulse control valves are pulsed at a predetermined frequency to prevent the formation of a steady thermal boundary layer about the workpiece to improve the rate of heat transfer between the flame and the workpiece.

33 Claims, 1 Drawing Sheet

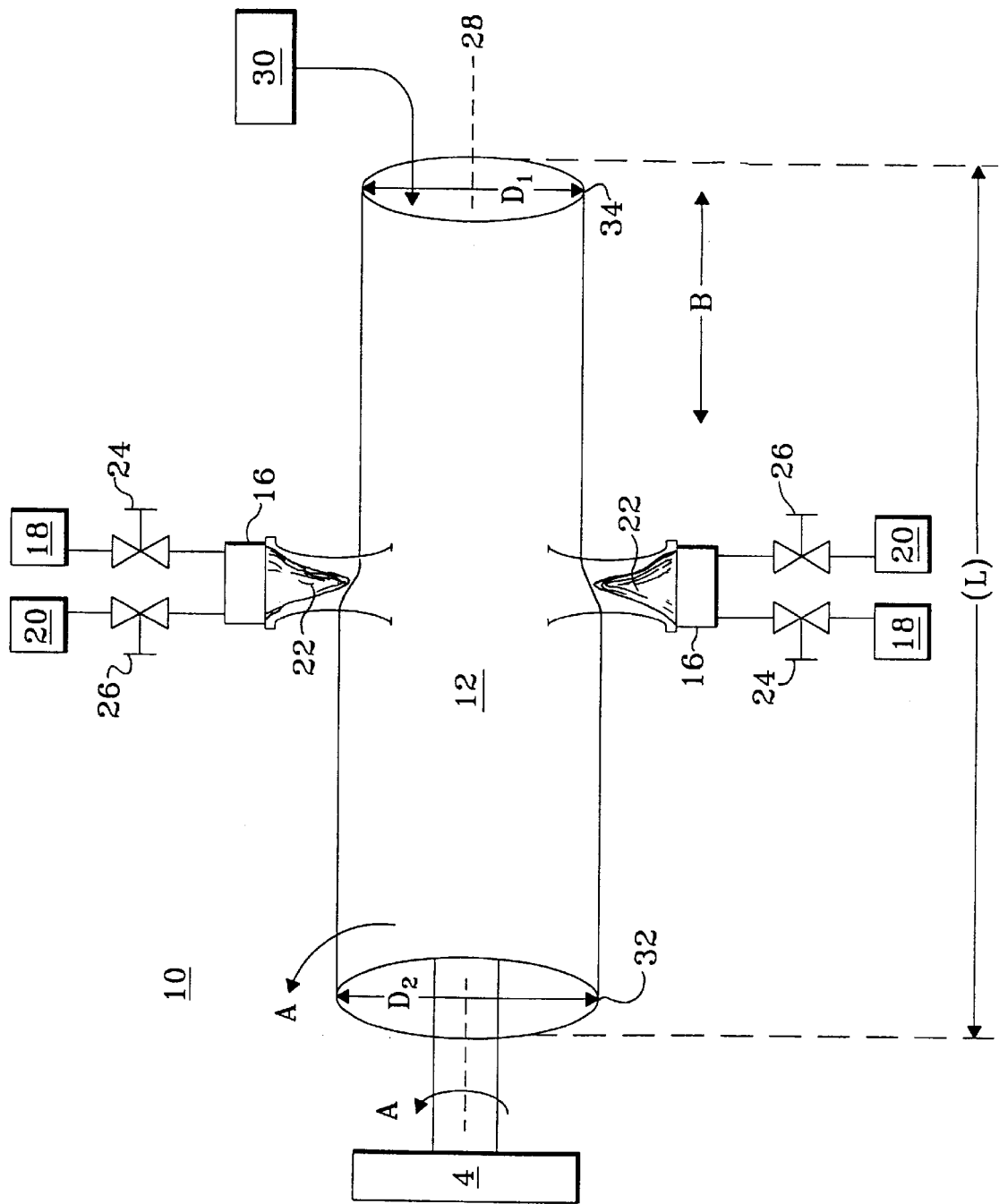

PULSED FUEL-OXYGEN BURNER AND METHOD FOR ROTATABLE WORKPIECES

BACKGROUND OF THE INVENTION

This invention relates generally to fuel-oxygen burners and more specifically to pulsed fuel-oxygen burners for rotatable workpieces.

High-purity quartz tubes are currently produced for use in the silicon chip processing industries. One method of manufacturing large outside diameter quartz tubes, for example, between about 300 mm to about 500 mm outside diameter quartz tubes, is to resize smaller diameter quartz tubes, for example, quartz tubes having an outside diameter of less than about 250 mm.

One method of performing this resizing operation is analogous to glass-blowing. A quartz tube is mounted horizontally on a rotating lathe. The interior of the quartz tube is slightly pressurized, while the outside of the quartz tube is heated by natural gas-oxygen jet flames, which jet flames impinge upon the outside of the rotating quartz tube. The burners are first positioned at one end of the quartz tube and are slowly translated down the length of the quartz tube. The heat from the impinging flames soften the quartz, thus allowing the tube to expand due to the internal pressure. This quartz tube is rotated to maintain a circular cross-section and to distribute the heat from the flames evenly around the circumference of the quartz tube.

A conventional process typically increases the diameter of a quartz tube by about 50 mm with a single pass of the burners, which pass may require up to about 45 minutes, depending on the length of the tube. Larger diameter increases are achieved by making multiple passes of the burners down the length of a tube.

One drawback of this method of resizing is the large amount of natural gas and oxygen consumed by the burners. The cost of resizing a quartz tube can be as high as $30/lb. of quartz, mostly comprising the cost of the natural gas and oxygen. This high cost is due, in part, to low efficiency of transferring heat from the burning natural gas-oxygen jet to the rotating quartz tube. Improving heat transfer from the burning natural gas oxygen jets to the rotating quartz tube could result in substantial fuel and oxygen cost savings. Additionally, increasing the rate of heat transfer from the flame to the tube could reduce processing time and increase productivity.

Accordingly, there is a need in the art for an improved fuel-oxygen burner and application for quartz tube resizing.

SUMMARY OF THE INVENTION

An apparatus for applying heat to a rotatable workpiece is disclosed. A rotating lathe is provided for mounting a workpiece, for example a quartz tube, thereto so as to enable rotation of the workpiece. At least one translatable burner is coupled to a fuel source and an oxygen source for producing a flame. The burner is directed such that the flame impinges upon the workpiece mounted on the rotating lathe. A first pulse control valve is coupled to and positioned between the translatable burner and the fuel source. A second pulse control valve is coupled to and positioned between the translatable burners and the oxygen source. The first and second pulse control valves are pulsed at a predetermined frequency to prevent the formation of a steady thermal boundary layer about the workpiece to improve the rate of heat transfer between the flame and the workpiece.

BRIEF DESCRIPTION OF THE DRAWINGS

The FIGURE is a schematic, cross-sectional, side-elevational view of one embodiment of the instant invention.

DETAILED DESCRIPTION OF THE INVENTION

An apparatus 10 for applying heat to a rotatable workpiece 12, typically a quartz tube, is shown in FIG. 1.

Apparatus 10 typically comprises a rotating lathe 14 to mount a respective workpiece 12 to. Rotating lathe 14, when enabled to do so, rotates in the general direction of arrow A, and workpiece 12, which workpiece 12 is mounted to lathe 14, also rotates in the general direction of arrow A.

At least one translatable burner 16 is coupled to a fuel source 18 and an oxygen source 20 for producing a flame 22. Flame 22 is directed to impinge upon workpiece 12 when workpiece 12 is mounted on rotating lathe 14.

A first pulse control valve 24 is coupled to and disposed between at last one translatable burner 16 and fuel source 18. A second pulse control valve 26 is coupled to and disposed between at least one translatable burner 16 and oxygen source 20.

In accordance with one embodiment of the instant invention, first and second pulse control valves 24, 26 are pulsed at a predetermined frequency to prevent the formation of a steady thermal boundary layer about an impinged upon workpiece 12 to improve the rate of heat transfer between flame 22 and workpiece 12.

As discussed above, workpiece 12 is typically a quartz tube. Quartz tube 12 is horizontally mounted on rotating lathe 14 to be rotated about a central axis 28. The interior of quartz tube 12 is typically pressurized via a pressure source 30, for example, a nitrogen purge. The outside of the rotating quartz tube 12 is heated by flame 22, which flame 22 impinges upon the outside of quartz tube 12.

At least one translatable burner 16 is typically positioned adjacent a first end 32 of quartz tube 12 and is slowly translated along path "B" to a second end 34 of quartz tube 12 and back to first end 32, or until a respective operation is completed. The overall length (L) of quartz tube 12 is typically in the range between about 3 to about 10 feet.

A typical operation to be performed on apparatus 10 is resizing quartz tube 12 from a first outside diameter ($D_1$), typically in the range between about 200 mm to about 250 mm, to a second outside diameter ($D_2$), typically in the range between about 300 mm to about 500 mm.

The heat from the impinging flame(s) 22 softens quartz tube 12, allowing quartz tube 12 to expand due to the internal pressure provided by pressure source 30. Quartz tube 12 is rotated generally in the direction of arrow "A" by rotating lathe 14 to maintain a generally circular cross-section and to distribute the heat from flame(s) 22 evenly around the circumference of quartz tube 12.

As discussed above, at least one translatable burner 16 is typically slowly translated generally along path "B". In one embodiment, the rate of translation of at least one translatable burner 16 is in the range between about 0.5 in/min to about 2.0 in/min.

As discussed above, first and second pulse control valves 24, 26 are pulsed at a predetermined frequency to prevent the formation of a steady thermal boundary layer about quartz tube 12 to improve the rate of heat transfer between flame 22 and quartz tube 12. In one embodiment of the instant invention, first and second pulse control valves 24, 26 are pulsed at a frequency in the range between about 75 Hz. to about 150 Hz., and preferably at about 100 Hz. In one embodiment, first pulse control valve and second pulse control valve 24, 26 are synchronized so that each pulse control valve 24, 26 pulses substantially simultaneously.

In one embodiment of the instant invention, at least one translatable burner 16 comprises a first and a second translatable burner axially aligned and oppositely directed so as to each direct an impinging flame 22 upon a workpiece 12, disposed therebetween, as shown in FIG. 1. In this embodiment, apparatus 10 comprises two pulse control valves 24 coupled to and disposed between respective translatable burners 16 and fuel source 18 and two pulse control valves 26 coupled to an disposed between respective translatable burners 16 and oxygen source 20.

Each of the pulse valves 24, 26 are pulsed at a predetermined frequency to prevent the formation of a steady thermal boundary layer about an impinged upon workpiece 12 to improve the rate of heat transfer between flames 22 and workpiece 12. In one embodiment, all four pulse control valves 24, 26 are pulsed at a frequency in the range between about 75 Hz. to about 150 Hz. and preferably at about 100 Hz. In another embodiment, all four pulse control valves 24, 26 are synchronized so that each pulse control valve pulses substantially simultaneously.

While only certain features of the invention have been illustrated and described, many modifications and changes will occur to those skilled in the art. It is, therefore, to be understood that the appended claims are intended to cover all such modifications and changes as fall within the true spirit of the invention.

We claim:

1. An apparatus for applying heat to a rotatable workpiece, said apparatus comprising:
    a rotating lathe for mounting a workpiece thereto so as to enable rotation thereof;
    at least one translatable burner coupled to a fuel source and an oxygen source for producing a flame directed to impinge upon a workpiece mounted upon said rotating lathe;
    a first pulse control valve coupled to and disposed between said at least one translatable burner and said fuel source; and
    a second pulse control valve coupled to and disposed between said at least one translatable burner and said oxygen source;
    wherein said first and second pulse control valves are pulsed at a predetermined frequency to prevent the formation of a steady thermal boundary layer about said workpiece to improve the rate of heat transfer therebetween.

2. An apparatus in accordance with claim 1, wherein said workpiece is a quartz tube.

3. An apparatus in accordance with claim 2, wherein said quartz tube is internally pressurized.

4. An apparatus in accordance with claim 2, wherein an outside diameter of said quartz tube is in the range between about 250 mm to about 500 mm.

5. An apparatus in accordance with claim 2, wherein said apparatus is utilized to resize a quartz tube having an outside diameter in the range between about 200 mm to about 250 mm to a quartz tube having an outside diameter in the range between about 300 mm to about 500 mm.

6. An apparatus in accordance with claim 2, wherein said quartz tube has a length in the range between about 3 to about 10 feet.

7. An apparatus in accordance with claim 6, wherein at least one translatable burner impinges said flame upon a first end of said quartz tube and translates said flame along the length of said quartz tube.

8. An apparatus in accordance with claim 1, wherein said at least one translatable burner translates at a rate between about 0.5 in./min. to about 2.0 in./min.

9. An apparatus in accordance with claim 1, wherein said first pulse control valve and said second pulse control valve are pulsed at a frequency in the range between about 75 Hz. to about 150 Hz.

10. An apparatus in accordance with claim 1, wherein said first pulse control valve and said second pulse control valve are pulsed at a frequency of about 100 Hz.

11. An apparatus in accordance with claim 1, wherein said first pulse control valve and said second pulse control valve are synchronized so that both pulse control valves pulse substantially simultaneously.

12. An apparatus in accordance with claim 1, wherein said at least one translatable burner comprises a first and a second translatable burner axially aligned and oppositely directed so as to each direct an impinging flame upon a workpiece disposed therebetween.

13. An apparatus in accordance with claim 12, further comprising:
    a third pulse control valve coupled to and disposed between said second translatable burner and said fuel source; and
    a fourth pulse control valve coupled to and disposed between said second translatable burner and said oxygen source;
    wherein said third and fourth pulse control valves are pulsed at a predetermined frequency to prevent the formation of a steady thermal boundary layer about an impinged upon workpiece to improve the rate of heat transfer therebetween.

14. An apparatus in accordance with claim 13 wherein said pulse control valves are pulsed at a frequency in the range between about 75 Hz. to about 150 Hz.

15. An apparatus in accordance with claim 13 wherein said pulse control valves are pulsed at frequency of about 100 Hz.

16. An apparatus in accordance with claim 13, wherein said pulse control valves are synchronized so that each pulse control valve pulses substantially simultaneously.

17. A method of applying heat to a workpiece comprising the method steps of:
    rotating a workpiece about a central axis;
    translating an impinging flame relative to a length of said central axis; and
    pulsing said impinging flame to prevent the formation of a steady thermal boundary layer about said workpiece to improve the rate of heat transfer between said flame and said workpiece, wherein said step of translating an impinging flame utilizes at least one translatable burner coupled to a fuel source and an oxygen source for producing said impinging flame.

18. A method in accordance with claim 17, wherein said step of rotating a workpiece utilizes a rotating lathe.

19. A method in accordance with claim 17, wherein said step of pulsing said impinging flame utilizes a first pulse control valve coupled to and disposed between said at least one translatable burner and said fuel source and a second pulse control valve coupled to an disposed between said at least one translatable burner and said oxygen source, wherein said first and second pulse control valves are pulsed at a predetermined frequency.

20. A method in accordance with claim 17, wherein said workpiece is a quartz tube.

21. A method in accordance with claim 20, wherein said quartz tube is internally pressurized.

22. A method in accordance with claim 20, wherein an outside diameter of said quartz tube is in the range between about 250 mm to about 500 mm.

23. A method in accordance with claim 20, wherein said method is utilized to resize a quartz tube having an outside diameter in the range between about 200 mm to about 250 mm to a quartz tube having an outside diameter in the range between about 300 mm to about 500 mm.

24. A method in accordance with claim 20, where said length of said quartz tube is in the range between about 3 to about 10 feet.

25. A method in accordance with claim 17 wherein said step of translating an impinging flame is completed at a rate between about 0.5 in./min. to about 2.0 in./min.

26. A method in accordance with claim 19, wherein said first pulse control valve and said second pulse control valve are pulsed at a frequency in the range between about 75 Hz. to about 150 Hz.

27. A method in accordance with claim 19, wherein said first pulse control valve and said second pulse control valve are pulsed at a frequency of about 100 Hz.

28. A method in accordance with claim 19 wherein said first pulse control valve and said second pulse control valve are synchronized so that each pulse control valve pulses substantially simultaneously.

29. A method in accordance with claim 17, wherein said at least one translatable burner comprises a first and a second translatable burner axially aligned and oppositely directed so as to each direct an impinging flame upon a workpiece disposed therebetween.

30. A method in accordance with claim 20, wherein said step of pulsing said impinging flame utilizes a first pulse control valve coupled to and disposed between said first translatable burner and said fuel source, a second pulse control valve coupled to and disposed between said first translatable burner and said oxygen source, a third pulse control valve coupled to and disposed between said second translatable burner and said fuel source and a fourth pulse control valve coupled to and disposed between said second translatable burner and said oxygen source, wherein said control valves are pulsed at a predetermined frequency.

31. A method in accordance with claim 30, wherein said pulse control valves are pulsed at a frequency in the range between about 75 Hz. to about 150 Hz.

32. A method in accordance with claim 30, wherein said pulse control valves are pulsed at a frequency of about 100 Hz.

33. A method in accordance with claim 30, wherein said pulse control valves are synchronized so that each pulse control valve pulses substantially simultaneously.

* * * * *